United States Patent [19]

Clappier

[11] Patent Number: 4,752,864

[45] Date of Patent: Jun. 21, 1988

[54] CONSTANT VOLTAGE POWER SUPPLY

[75] Inventor: Robert R. Clappier, Los Altos, Calif.

[73] Assignee: Metcal, Inc., Menlo Park, Calif.

[21] Appl. No.: 42,296

[22] Filed: Apr. 24, 1987

[51] Int. Cl.4 .......................................... H02P 13/24
[52] U.S. Cl. ...................................... 363/86; 363/41;
363/89; 320/1
[58] Field of Search ...................... 363/41, 60, 86, 89;
320/1; 307/110

[56] References Cited

U.S. PATENT DOCUMENTS

| 4,002,963 | 1/1977 | Hunter | 363/41 |
| 4,160,996 | 7/1979 | Nigra et al. | 320/1 |
| 4,405,889 | 9/1983 | Overstreet et al. | 363/86 X |
| 4,665,476 | 5/1987 | Masuda | 320/1 |

FOREIGN PATENT DOCUMENTS 56-47816  4/1981  Japan ..................... 363/86

*Primary Examiner*—Peter S. Wong
*Attorney, Agent, or Firm*—Hall, Myers & Rose

[57] ABSTRACT

A constant voltage power supply employs a circuit in which the average voltage over a specified period of time is maintained constant by a circuit for charging a voltage storage means with width modulated pulses applied several times during each specified period whereby to charge the storage means above the desired average level and terminating charging until the voltage falls below the specified level. The period of time over which the voltage is averaged is a function of the thermal inertia of a load to be driven. The average voltage is employed as the energizing circuit to a high frequency oscillator, and driver stages supplying the output of the oscillator to an output stage of a power supply whereby the energizing voltage of the stages and thus the dissipation of energy therein does not exceed that required to feed the lead at its then current energy requirements.

9 Claims, 3 Drawing Sheets

CONSTANT VOLTAGE POWER SUPPLY

The present invention relates to power supplies and more particularly to a constant voltage power supply providing low heat loss under heavy loads.

In U.S. Pat. No. 4,626,767, a co-invention of the present inventor, there is described a constant voltage power supply which with appropriate additional circuitry supplied a constant current to a load having widely varying energy demands. The supply of the patent was specifically designed for use with soldering irons generally of the type described in U.S. Pat. No. 4,256,945 and application Ser. No. 666,346, filed Oct. 30, 1984.

The supply was thoroughly acceptable for the loads for which it was designed but with the advent of more powerful irons overheating problems have developed. Certain constraints were placed on the redesign and specifically the RF board, FIG. 2 of U.S. Pat. No. 4,626,767 could not be changed.

BRIEF SUMMARY OF THE INVENTION

According to the present invention instead of maintaining the output voltage constant on an incremental time basis, the average of the voltage as maintained constant over a specified period related to the thermal inertia of the load, for instance, half a second. This concept is accomplished, for instance, by charging a capacitor or capacitors supplying the voltage to the oscillator and driver of the aforesaid patent through an SCR supplied by a rectified but unfiltered ac with turn-off controlled by a pulse width modulator. The modulator is in turn controlled in response to the ac output voltage of the power supply and it cyclically charges the capacitor(s) whenever the output voltage falls below a specified level. The capacitor is not charged when the output voltage is above a specified level whereby such voltage varies about the desired voltage and averages at the desired level over a short period of time.

The pulse width modulator is used as an asynchronous switching power controller and produces pulses to the capacitor(s) of a length that vary with the degree of error in the output voltage. The SCR shuts off at the end of each half cycle of the supply voltage and if the modulator is still producing an output pulse the SCR is turned back on immediately upon its threshold being exceeded. The modulator produces pulse at a maximum rate determined by the supply voltages and chip employed. In the present case the pulses are produced at a fixed rate of 10 Hz; more than ample in view of the half second average voltage requirement. As indicated above, the turn-off time of the pulse is a function of the dc feedback (output) voltage and also as stated above, the turn-off time of the SCR is determined by the zero voltage, actually current, of the source. It should be noted that the voltage to the SCR is taken from the non-grounded center tap of a transformer feeding a full wave rectifier whereby the voltage at the center tap is a series of positive pulses at twice the power input frequency, the latter being 60 Hz and the former 120 Hz.

The particular modulator chip described herein is an SG3526 of Silicon General.

Contrary to the circuit of U.S. Pat. No. 4,626,767, no attempt is made to control the voltage supplied to the RF output stage and thus a series power regulator, a major source of heat loss, is not required. Further, control is now applied to the oscillator and driver stages in turn supplying control signals to the control element of the output stage. These circuits were also a major source of power loss. In accordance with the present invention the power supplied to those circuits is varied in accordance with load requirements thus further reducing power dissipation and reducing heat in the system.

Very importantly, the transfer of output voltage control away from the supply voltage of the output stage or specifically from the output circuit of the output stage, and further the elimination of the series voltage regulator, the use of a pulse width modulator that uses power only when generating pulses and the variation of the supply voltage to the oscillator and driver stages (rather than the output stage) as a function of load and the use of average rather than incremental voltage control have materially increased efficiency, specifically by about 50 percent.

DETAILED DESCRIPTION

Figure 1:
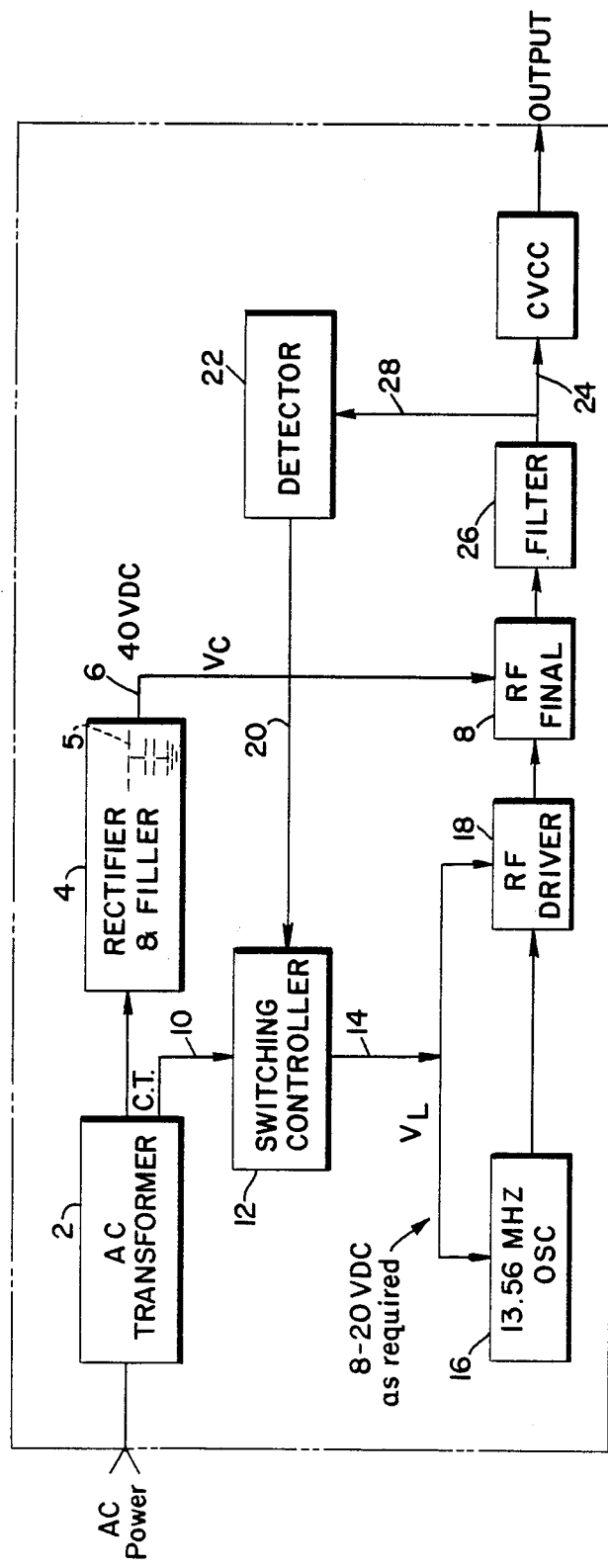
FIG. 1 is a block diagram of the circuit of the present invention.

Referring now to FIG. 1 of the accompanying drawings, there is illustrated a block diagram of the present invention. AC power at 60 Hz is supplied to a center tapped transformer 2 supplying across its full secondary winding, ac at an appropriate voltage to a full wave rectifier and filter 4 to produce 40 VDC on a lead 6. The lead 6 supplies this voltage to final RF stage 8. This voltage is unregulated and in fact in the present realization of the invention varies with load due to the internal impedance of the transformer 2.

The transformer develops on lead 10 a 120 Hz rectified 60 Hz wave to a switching controller 12 that supplies via lead 14 supply voltage to an RF oscillator 16 and RF driver 18. The oscillator 16 operates, for instance, at 13.56 MHz as in the prior patent.

The switching controller is a pulse width modulator controlled by a signal on a lead 20 developed by a detector 22 from the output voltage of the system. Specifically the RF output stage 8 supplies a voltage to output lead 24 through a filter stage 26; this voltage being supplied to the detector 22 via a lead 28.

In operation, the voltage on output lead 24 controls the length of pulses produced by the pulse width modulator 12 at 10 Hz. The length of the pulses determines the average voltage supplied to the oscillator 16 and driver 18 and thus controls the magnitude of the signal supplied to the control element of the RF output stage to complete the feedback control loop.

It will be noted that in this circuit there is no control of the output power by the use of series regulators. Regulation is affected by controlling the supply voltages to the oscillator and driver stages and these voltages in turn are controlled by the length of pulses supplied by a pulse width modulator.

Figure 2:
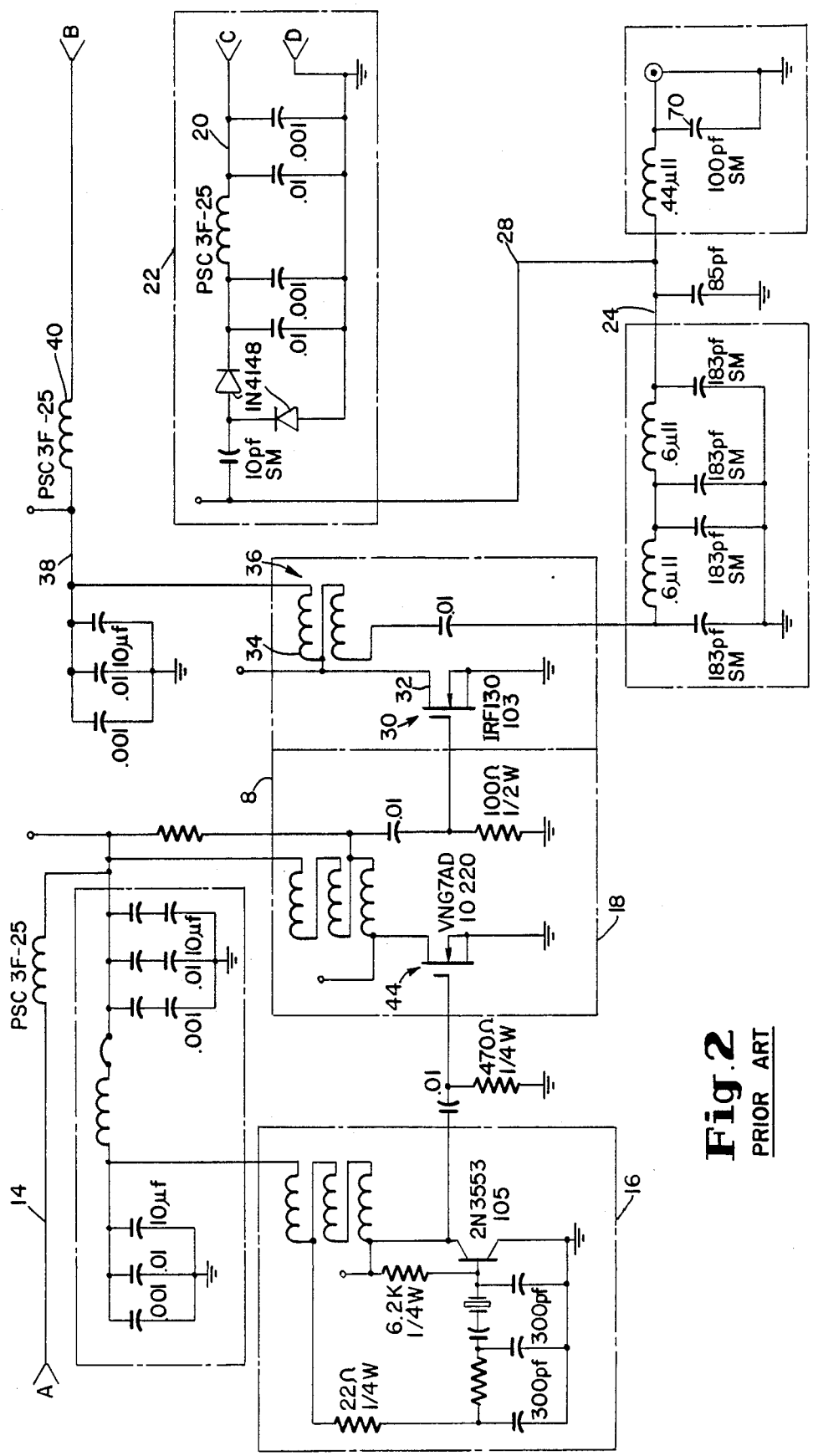
FIG. 2 is a circuit diagram of the oscillator, driver, power amplifier and detector of FIG. 2 of U.S. Pat. No. 4,626,767 with which the circuit of FIG. 3 is intended to cooperate.

Reference is now made to FIG. 2 of the accompanying drawings which is a reproduction, with reference numerals changed, of FIG. 2 of U.S. Pat. No. 4,626,767.

Briefly describing this figure, supply voltage is provided for an output stage comprising FET 30 having its drain 32 connected via a winding 34 of a transformer 36 to a source of supply voltage on lead 38. This lead is connected to a terminal B via a choke 40. In the patented supply the voltage on terminal B is varied to provide output voltage control. The input circuit to the FET is driven at maximum input at all times by the oscillator and driver stages which operate at fixed voltages thus causing the FET to dissipate a large amount of excess energy and thus be a major producer of heat. As will become apparent in the discussion of FIG. 3 no control is placed on the supply voltage of the output FET and the output stage only utilizes that power that is necessary to maintain voltage.

The oscillator employed is a modified Pierce oscillator 16 providing a high frequency signal, preferably in the range of 8 MHz to 20 MHz, to a driver stage utilizing FET 44. The FET 44 receives a supply voltage, as does the oscillator 16, from a terminal A. As previously indicated in the prior power supply the oscillator and driver stages were operated at full voltage and thus full power at all times causing both of these devices to consume large amounts of excess energy.

The operation of the device is as described in the aforesaid patent except that as seen in FIG. 1 the final stage comprising FET 30 does not receive a signal on its drain but receives a voltage from terminal B of approximately 40 V which voltage does not carry any control information. The FET is again operated in its saturated region to provide protection against large VSWRs. The voltage on terminal A is supplied from a varying voltage control source so that the oscillator and driver only produce a signal necessary to maintain the output level at the desired level.

Figure 3:
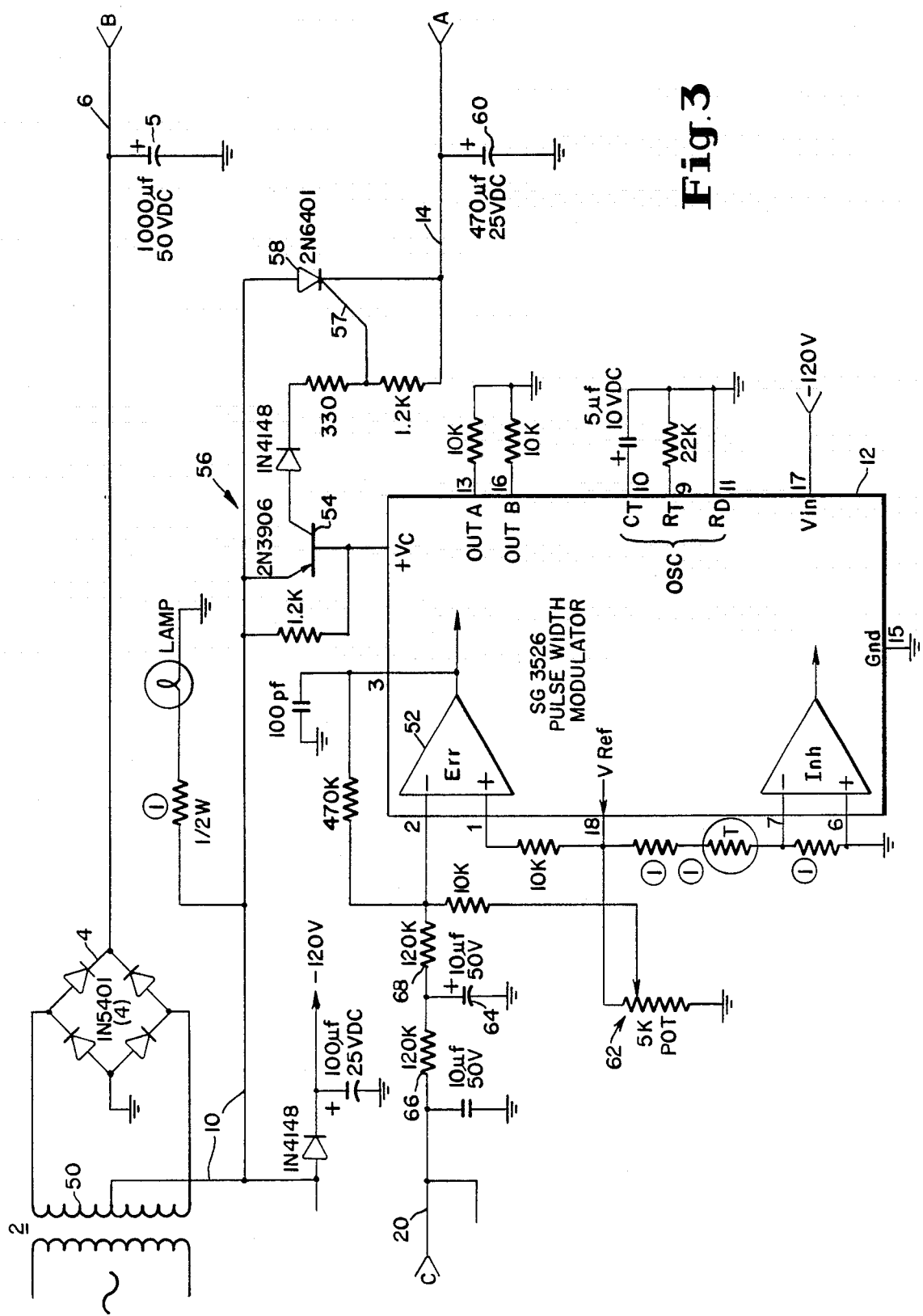
FIG. 3 is a circuit diagram of the voltage supply and control circuits employed to control the circuits of FIG. 2.

Reference is now made to FIG. 3 of the accompanying drawings for a diagram of the circuits supplying voltage to terminals A and B.

A transformer 2 has a center tapped secondary 50 with a full wave rectifier 4 connected across the outer ends of the secondary. A filter capacitor 5 is connected between the lead 6 and ground. The lead 6 is connected to terminal B and thus supplies voltage, about 40 VDC in this instance to the choke 40 of FIG. 2 and ultimately voltage to the drain 32 of FET 30. Thus an unmodulated voltage is supplied to the final RF stage; the output of which is supplied via filter 26 to the constant voltage to constant current converter.

The voltage applied to the filter 26 is an ac voltage which is sensed via lead 28 by the detector 22, rectified and filtered in the detector (see FIG. 2) and provided to terminal C. The output voltage on lead 20 is a function of the output voltage to be controlled and is fed to the negative terminal of an input amplifier 52 of pulse width modulator 12. The width modulated output pulses of the modulator 12 are applied to base 54 of a transistor 56 which controls gate 56 of SCR 58.

The SCR 58 is connected in series between lead 10 and terminal A (lead 14); a capacitor 60 being connected between lead 14 and ground. It is the charge on this capacitor that determines the supply voltage applied to the oscillator 16 and the driver stage 18.

As previously indicated, it is the aim of the invention to maintain the average voltage on the capacitor 60 over a period commensurate with the thermal inertia of the load at a level that provides the desired voltage on the lead 24. This voltage across the capacitor varies above and below the desired voltage as it is pulsed by the SCR and drained by the oscillator and driver stages. More specifically if the output voltage falls below the desired level the dc voltage on lead 20 falls below a threshold level established by potentiometer 62 and a train of pulses is developed on lead 54. The length of each pulse train is a function of the voltage on lead 20. The actual averaging effect is achieved by a capacitor 64 connected between the junction of resistors 66 and 68 and ground. The resistors are connected in series between lead 20 and pin 2 of the modulator 12. The time constant of this circuit is roughly 0.6 second. Thus it is the function of the modulator to charge capacitor 60 such that the average voltage on capacitor 64 is maintained at a relatively slowly varying level that averages at that required to produce the desired output voltage of the supply. To this end the SCR 58 is fired on each rise of the 120 cycle pulses appearing on lead 10 whenever there is an output pulse from the modulator. The SCR is rendered non-conductive whenever the ac voltage or voltage pulses on lead 56 fall to approximately zero volts. Thus the rate of charging of capacitor 60 is a function of the duration of the output pulses from the modulator 12; the duration of the pulses being determined by the voltage on lead 20 and the setting of the potentiometer 62 which latter element therefore constitutes the control for setting the desired output voltage level.

In operation the capacitor 64 is overcharged slightly so that on the next cycle or cycles the modulator produces no pulses and the SCR does not fire. The capacitor 60 discharges under load and when the voltage on capacitor 64 falls below the set level, the modulator again produces pulses of a duration commensurate with the charging rate of the capacitor 60 required to restore the output voltage.

The system of the present invention thus consumes internally compared with the prior circuit far less energy at high power loads where all of the components are approaching their desired limits. As previously indicated the present circuit is approximately 50% more efficient under large loads than the prior circuit due primarily to the removal of the supply voltage source from the control loop, the average voltage control approach, varying the energy delivered by the oscillator and driver stages as a function of load and the elimination of a series voltage regulator. The circuit not only consumes less energy but is less expensive to build and has longer hours of life and of trouble free operation.

Other improvements, modifications and embodiments will become apparent to one of ordinary skill in the art upon review of this disclosure. Such improvements, modifications and embodiments are considered to be within the scope of this invention as defined by the following claims.

What is claimed is:

1. In a constant voltage ac source having an oscillator stage for generating a constant frequency ac, an output stage, a driver stage for supplying an output voltage from said oscillator stage to the output stage, the output stage adapted to drive a load having a specified thermal inertia, and means for deriving a control signal indicative of the amplitude of the output voltage, an output voltage amplitude control circuit comprising a voltage storage means for supplying energizing voltage to the oscillator stage and the driver stage, means for maintaining over a specified time period the average voltage of said voltage storage means, said specified time period being a function of the thermal inertia of an intended load, said means for maintaining including means responsive to said control signal for periodically supplying voltage pulses to said voltage storage means only when the output voltage is below a desired level.

2. A voltage control system comprising a variable voltage source, and means for maintaining over a specified period of time the average voltage of said voltage source at a specified level, said means for maintaining including means responsive to a function of the voltage of said voltage source for periodically increasing the voltage of said voltage source only when its voltage is below said specified level.

3. A voltage control system according to claim 2 wherein said voltage source is intended to energize a load having thermal inertia, said means for maintaining including means for determining the specified period of time as a function of the thermal inertia of the intended load.

4. A voltage control system according to claim 3 wherein said variable voltage source is a voltage storage means and said means for maintaining periodically increases the magnitude of stored voltage only when the stored voltage is below said specified level.

5. A voltage control system according to claim 4 wherein said means for maintaining comprisies a pulse width modulator periodically producing pulse of a width that varies as a function of the voltage of said voltage storage means, said modulator producing such pulses only when the voltage of said storage means is below said specified level.

6. A voltage control system according to claim 2 or 3 wherein said voltage source is a capacitor.

7. A voltage control system according to claim 4 or 5 wherein said voltage storage means is a capacitor.

8. A voltage control system according to claim 4 or 5 wherein the periodicity of said means for maintaining is such that when said voltage is below its average value said voltage storage means is recharged several times during each said period of time.

9. A method of maintaining an average level of voltage of a voltage storage means over a specified period of time comprising the steps of sensing an instantaneous voltage of the voltage storage means, periodically charging the voltage storage means to a voltage above the average level with voltage pulses several times during each specified period of time only when the voltage of said voltage storage means is below the desired average level, and controlling the length of the voltage pulses as a function of the instantaneous voltage of the voltage storage means.

* * * * *